United States Patent [19]

Ruthel

[11] Patent Number: 5,104,500
[45] Date of Patent: Apr. 14, 1992

[54] ION EXCHANGE REMOVAL OF IMPURITIES FROM CHLORATE PROCESS LIQUORS

[75] Inventor: Walter W. Ruthel, Grand Island, N.Y.

[73] Assignee: Occidental Chemical Corporation, Niagara Falls, N.Y.

[21] Appl. No.: 516,397

[22] Filed: Apr. 30, 1990

[51] Int. Cl.$^5$ .......................... C25B 1/26; B01J 39/00
[52] U.S. Cl. ........................................ 204/94; 204/94; 204/95; 210/687
[58] Field of Search ...................... 204/94, 95; 210/687

[56] References Cited

U.S. PATENT DOCUMENTS

| 4,374,711 | 2/1983 | Ogawa | 204/98 |
| 4,405,418 | 9/1983 | Takemura | 204/95 |
| 4,702,805 | 10/1987 | Burkell et al. | 204/95 |
| 4,888,099 | 12/1989 | Welander et al. | 204/95 |

OTHER PUBLICATIONS

Wolff, "Ion Exchange Purification of Feed Brine for Chlor-Alkali Electrolysis Cells, The Role of Duolite C-467"; pp. 1-12.

Primary Examiner—John Niebling
Assistant Examiner—David G. Ryser
Attorney, Agent, or Firm—James F. Tao; Richard D. Fuerle

[57] ABSTRACT

Disclosed is an improved method of operating a sodium chlorate crystal production system where a brine stream is electrolyzed to form sodium chlorate, the sodium chlorate is crystallized in a crystallizer, and the mother liquor from a crystallizer is recycled to the brine stream. The improvement comprises passing the mother liquor through a cationic chelating ion exchange column before it is returned to the brine stream, and operating the ion exchange column so that it removes, on the average, only the amount of calcium that enters the system in the brine stream.

19 Claims, 3 Drawing Sheets

ION EXCHANGE REMOVAL OF IMPURITIES FROM CHLORATE PROCESS LIQUORS

BACKGROUND OF THE INVENTION

This invention relates to the use of an ion exchange resin to remove impurities such as calcium from a chlorate mother liquor. Specifically, it relates to the use of a cationic chelating ion exchange resin to remove as much calcium from the recycled mother liquor as is added in the feed.

Sodium chlorate crystals can be made by electrolyzing a sodium chloride brine stream in an electrolytic cell to produce a solution of sodium chlorate. After concentration, if necessary, the solution is cooled to precipitate the sodium chlorate crystals. In order to increase the concentration of sodium chlorate, it is desirable to recycle the mother liquor from the crystallizer to the cells.

The brine used to make sodium chlorate normally contains calcium. The calcium concentration in the brine must be kept low in order for the cell to operate efficiently. Although most of the calcium in the brine can be removed by precipitation with sodium carbonate, about ½ to about 5 parts by weight per million of solution (ppm) of calcium can remain in the brine. Since only a small amount of that calcium is removed with the sodium chlorate crystals, the concentration of calcium and other impurities in the electrolytic system would quickly build up as the mother liquor from the crystallizer is recycled.

The impurities in the system can be removed by dumping the system about every six months and washing the cells, but this represents a loss of a substantial amount of production time and cost for tankage and liquor cleanup. Removal by conventional ion exchange is also possible but is very expensive.

SUMMARY OF THE INVENTION

We have discovered that calcium and other impurities can be removed from a sodium chlorate crystal producing system by passing the mother liquor from the crystallizer through a cationic chelating ion exchange column which is not operated as a conventional ion exchange column, but rather is operated inefficiently so that it removes an amount of calcium equal to the amount that is being added to the system. That is, while a conventional ion exchange column is operated so that it removes virtually all of an impurity until the column becomes fully loaded, whence it removes none of the impurity, the ion exchange column in this invention removes only a portion of the calcium in the mother liquor, that portion being approximately equal to the amount of calcium being added to the system, so that the mother liquor leaving the ion exchange column still contains a controlled amount of calcium. However, the amount of calcium that remains in the system is tolerable (i.e., it would cost more to remove it than would be saved by the greater efficiency of the cell). By operating the ion exchange column in this manner, we are able to avoid dumping or purging the contents of the system in order to reduce the level of calcium in the system and thereby we avoid the loss of chlorate. In addition, by operating the ion exchange column inefficiently, so that it does not remove all or nearly all of the calcium that passes through it but only a portion of the calcium, we are able to use a small, inexpensive ion exchange column and avoid the use of large, costly ion exchange columns.

It is surprising that the ion exchange resin can successfully perform this function because it is being operated under conditions which are adverse to its efficient functioning. For example, it is being operated in the lower portion of its pH range where it is less efficient; it is being operated at a temperature that is lower than that which is recommended for efficient operation; it is being operated at a calcium concentration that is below the concentration at which it can efficiently remove calcium; and it is being operated at a flow rate that is too high for it to have time to remove all the calcium in the mother liquor. Nevertheless, the resin successfully performs its desired function in this invention of preventing the buildup of calcium in the system.

DESCRIPTION OF THE INVENTION

Figure 1:
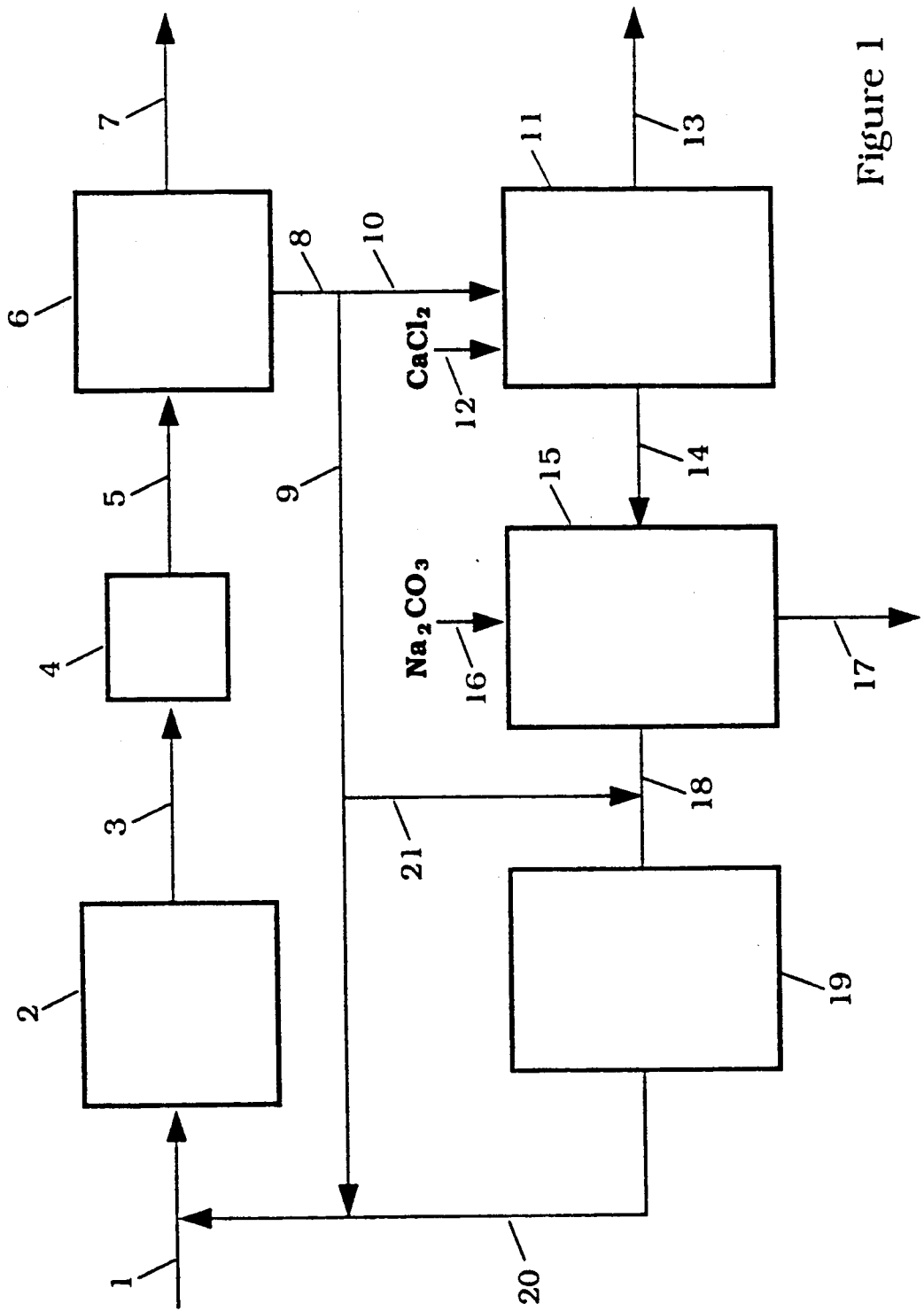
FIG. 1 is a diagrammatic view of a certain presently preferred embodiment of the process of this invention.

In FIG. 1, a feed brine stream in line 1 enters electrolytic cell 2 where it is electrolyzed to form a solution of sodium chlorate in line 3. The brine stream is typically at a temperature of about 25° to about 60° C. so that the heat from the electrolysis will raise its temperature to about 70° to about 80° C., which is the temperature range that is usually most efficient for producing sodium chlorate. The sodium chloride concentration in the brine stream is typically at or near saturation in order to reduce the amount of water that must be evaporated. The feed brine stream also typically contains about ½ to about 5 ppm calcium ion, about 2000 to about 3000 ppm of sulfate ion, and about 0.01 to about 1 ppm of fluoride ion. As is known in the art, about 1 to about 5 g/L sodium dichromate may be added to the electrolytic cell to increase its efficiency.

A typical composition for the sodium chlorate solution in line 3 is about 550 g/L sodium chlorate, about 120 to 130 g/L sodium chloride, about 1 to about 5 g/L sodium bichromite, and about 1 to about 2 g/L of sodium hypochlorite. The sodium chlorate stream in line 3 is usually passed to a hypo-kill stage 4 for the purpose of removing sodium hypochlorite, which is undesirable because it is very corrosive. Sodium hypochlorite can be removed by the addition of compounds such as sodium sulfite, hydrogen peroxide, sodium formate, and urea.

The sodium chlorate solution then passes through line 5 to crystallizer 6. If the concentration of sodium chlorate in line 5 is below about 600 g/L, it is usually desirable to flash-evaporate some water from the stream in order to raise the concentration of sodium chlorate The stream is then cooled to about 30° to about 40° C. in order to precipitate sodium chlorate crystals which can be removed by, for example, centrifuge through line 7. The mother liquor is then sent through line 8 where, typically, about 70 to about 95% by volume is passed through line 9 and the remaining 10% is passed through line 10 to the sulfate removal system 11.

Sulfate removal can be accomplished by a variety of means such as, for example, the addition of calcium chloride in line 12 which precipitates calcium sulfate, which is removed through line 13. The brine then passes through line 14 to calcium removal stage 15 where a source of carbonate ion is added to the brine through line 16 which causes a precipitate to form which is filtered off through line 17. The remaining brine, which usually still contains an undesirably high concentration (e.g., about 1.5 ppm) of calcium ion (as calcium sulfate), passes through line 18 to calcium removal stage 19, the subject of this invention.

In calcium removal stage 19 a cationic chelating ion exchange resin removes an amount of calcium that is approximately equal to the amount of calcium being added to the system in line 1. That is, while an ion exchange column operated in a conventional manner would remove nearly all of the calcium until the ion exchange column became exhausted, then remove no calcium, the ion exchange column in this invention is not operated in that manner, but instead is operated so that the flow rate through it is so great that the column cannot remove all or nearly all of the calcium in the mother liquor. As a result, except when the ion exchange column is started up, there will be a significant "breakthrough" of the column during the life of the resin in that calcium which the column would remove if the flow rate were slower will now not be removed but will pass on through the ion exchange column. Another way of looking at this is that the resin is operated at less than 90% of capacity and preferably at about 60 to about 80% of capacity. This means that the flow rate through the resin is fast enough so that the resin has time to remove only up to 90% of the calcium in the resin that it is capable of removing. While the column will remove slightly more calcium when it is fresh and less calcium after it has become partially loaded, on the average, the amount of calcium removed will be about equal to the amount entering the system in line 1. In a sense, the ion exchange column 19 acts as a scavenger for this excess calcium rather than as a means of purifying the mother liquor of calcium. In this way, a buildup of calcium in the system is prevented, although the calcium level entering cell 2 does not fall below about ½ ppm. Since the concentration of calcium in the feed brine in line 1 is higher than the concentration of calcium in the brine entering cell 2, it is preferable to remove enough calcium in the ion exchange column so that when the mother liquor in line 20 is mixed with the feed brine in line 1 the amount of calcium entering cell 2 is about 1 to about 2 ppm because higher concentrations of calcium increase the voltage demand of the cell and lower concentrations are too costly to obtain.

The conditions needed to make the ion exchange column perform in this fashion may vary with the particular ion exchange resin being used, but we have found that it is very desirable to operate the ion exchange column at a temperature of less than 45° C., and preferably at a temperature less than 35° C., in order to prevent the oxidation of the resin. While pH is not critical and preferably no pH adjustment is made to the mother liquor entering ion exchange column 19, the column typically operates at a pH of about 8 to about 9 as that is the usual pH of the mother liquor.

The resin must be a cationic chelating ion exchange resin as ordinary cationic resins will not work in the mother liquor because of its high concentration of sodium The resin is used in the sodium form because the acid form may form chlorine dioxide which is explosive. The major consideration in the design of the ion exchange resin and column is that its capacity and flow rate be selected so that it removes, on the average, the amount of calcium that is entering the system in line 1. Also, the ion exchange column must operate under extreme conditions of near saturation for the chlorate ion (approximately 530 g/L chlorate) and high concentrations of sodium chloride (approximately 125 g/L).

The resin is regenerated when it is less than 90% loaded, and preferably when it is about 60 to about 80% loaded. In one cycle of the resin (i.e., a cycle is the time that the resin is used before regeneration), the resin is operated so that it takes out approximately half of the calcium that passes through it in that cycle. A cationic chelating ion exchange resin will also remove other metal ions besides calcium, such as magnesium, strontium, barium, nickel, copper, and iron. Nickel is an especially important ion to be removed because nickel catalyzes the decomposition of hypochlorite to oxygen instead of to chlorate, resulting in a loss of product.

After passing through ion exchange column 19, the brine is recycled through line 20 back to line 1. A portion of line 9 is passed through line 21 to calcium removal stage 19 in order to adjust the calcium concentration in line 20 so that when it is mixed with feed brine in line 1 the concentration of calcium in the brine entering cell 2 will be about ½ to about 2 ppm.

The following examples further illustrate this invention.

EXAMPLE 1

Initial Resin Tests

An ion exchange column filled with 10 cc of a chelating resin composed of polystyrene-divinylbenzene copolymer with aminophosphonic functional groups sold by Rohm and Haas Company under the trademark "Duolite C467" was tested for calcium removal from a mother liquor from a recycle loop which had the following composition:

$NaClO_3$ 36.6 wt%
$NaCl$ 10 wt%
$Na_2SO_4$ 1.7 wt%
$Na_2Cr_2O_7$ 0.35 wt%

The amount of calcium removed in five calcium removal/regeneration cycles from each column is listed in the following table.

| Initial $Ca^{++}$ Concentration (ppm) | Calcium Removed (mg/l resin) |
| --- | --- |
| 9.0 | 18.4 |
| 6.0 | 14.1 |
| 3.2 | 7.5 |
| 1.9 | 6.7 |
| 0.76 | 3.4 |

(The amount of calcium removed by the columns with higher calcium feed concentrations was greater when the calcium concentrations in the solutions was greater due to equilibrium between the solution and the resin.)

Static tests were also performed on the ion exchange resin using a 49 ppm $Ca^{++}$ solution After six cycles of six hour tests, there appeared to be no degradation of the resin, as indicated by the amount of calcium removed from the solution.

Experiments were done to determine the cation exchange capacity of the resin before it had undergone any cycles and after it underwent twenty cycles. The cation exchange capacity was found to be 7.9 meq/g dry H-form resin or 1.6 eq/L wet Na-form resin. The solids content was about 41% in both cases indicating that no oxidation of the resin occurred.

EXAMPLE 2

Isotherms

Isotherms were generated to determine the calcium capacity of the resin as a function of calcium concentration in the mother liquor stream. Various amounts of resin were placed into 500 ml of mother liquor containing 25 ppm $Ca^{++}$. The solution was stirred and allowed to equilibrate overnight at 30° C. The results of these experiments are given in the following table:

| Equilibrium $Ca^{++}$ Conc. (ppm) | Resin Volume (ml) | Resin Capacity (g $Ca^{++}$/l resin) |
|---|---|---|
| 2.40 | 2.53 | 6.25 |
| 1.40 | 2.95 | 5.60 |
| 1.20 | 3.54 | 4.71 |
| 1.30 | 4.43 | 3.74 |
| 1.00 | 5.06 | 3.32 |
| 0.85 | 5.90 | 2.87 |
| 0.92 | 7.08 | 2.38 |
| 0.80 | 8.85 | 1.91 |
| 0.92 | 17.70 | 0.95 |

The data from the isotherm tests were analyzed using a modified Freundlich isotherm, where a plot of $\log(m_{Ca})\log(m^2_{Na})$ versus $\log([Ca]/[Na]^2)$ should give a straight line. (Harold F. Walton, *Ion Exchange Theory and Application*, F.C. Nachod, ed., Academic Press Inc., N.Y., (1949), p. 6.) Here [Ca] and [Na] are the molar concentrations of calcium and sodium, respectively, and $m_{Ca}$ and $m_{Na}$ are the resin capacities for calcium and sodium in units of mol/l resin. These values were calculated using the total cation capacity of 1.6 eq/l resin found earlier.

The data from the column tests and one of the beaker tests were also included in the analysis. A curve fit of the data results in the equation:

$$\log([Ca]/[Na]^2) = 0.4805 + 0.4386 \log(m_{Ca}/m^2_{Na})$$

This equation was used to back calculate the relationship between the calcium concentration in solution and the capacity of the resin for calcium.

Figure 2:
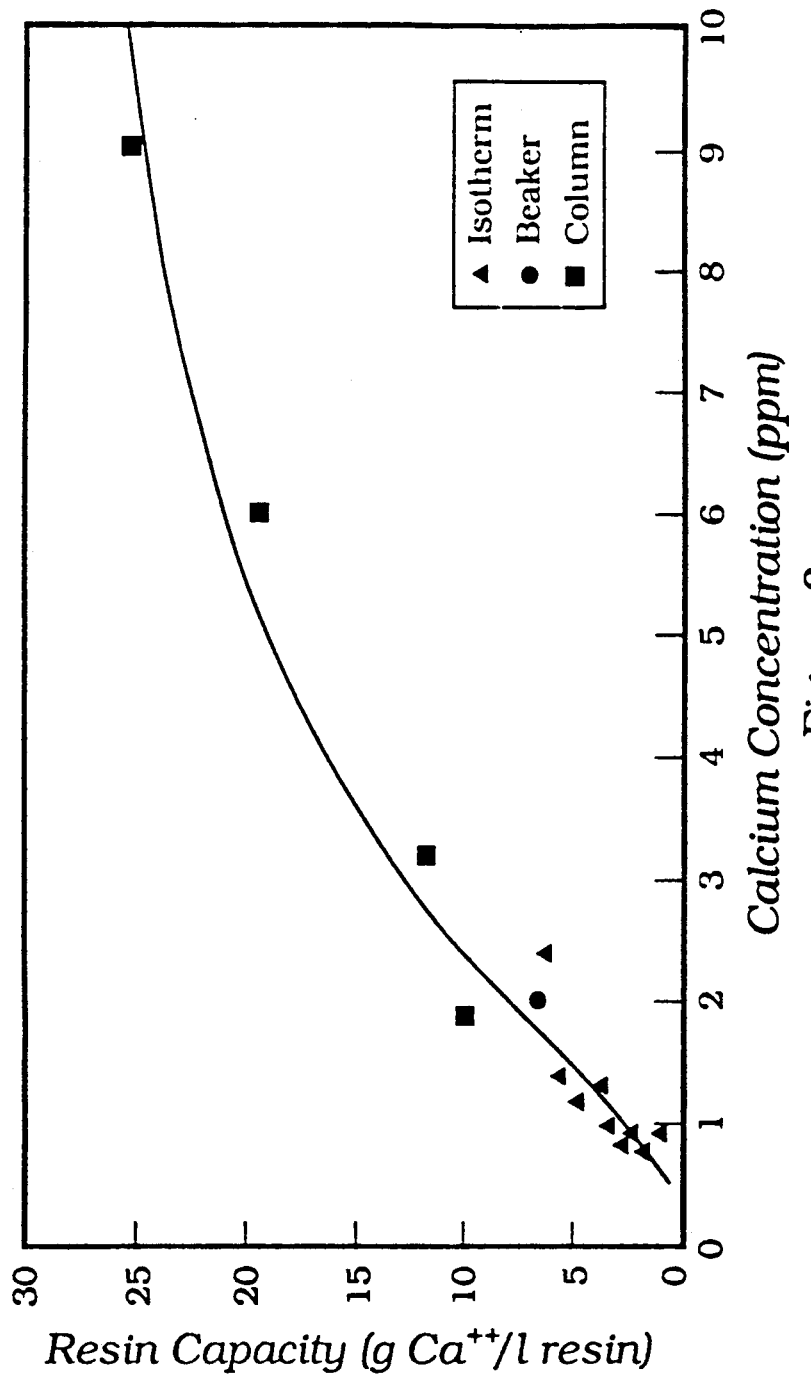
FIG. 2 is a graph giving the results of experiments conducted in Example 1, which plots resin capacity vs. calcium concentration.

The relationship between calcium concentration in the mother liquor and the capacity of the ion exchange resin for calcium removal is shown in FIG. 2. The experimental data are also shown for comparison. The capacity of the resin for calcium removal is 5.0 g $Ca^{++}$/l resin at 1.5 ppm $Ca^{++}$.

EXAMPLE 3

Pilot Plant Tests

The ion exchange column was operated under conditions simulating actual plant operation. The feed tank was filled with 16.8 l of synthetic mother liquor solution, to which 0.3 mg Ca/hr was added. A 10 cc bed of resin was used, and the flow rate through the resin was 30 BV/hr (bed volume per hour). The column was operated at 30° C. and a pH of 9.

Figure 3:
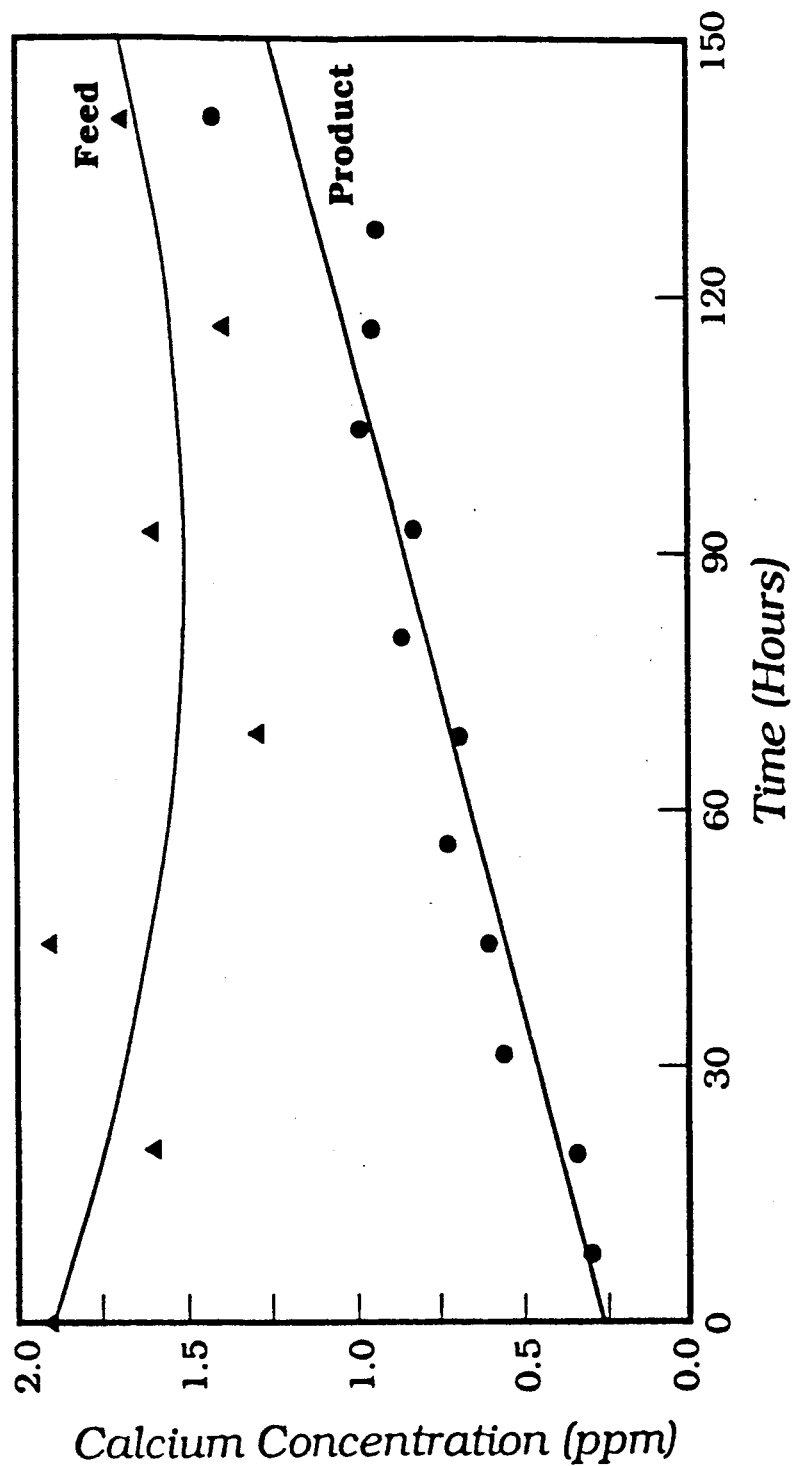
FIG. 3 is another graph giving results of experiments described in Example 1 and plots calcium concentration of the feed going into an ion exchange column and the liquor exiting from the column vs. time.

FIG. 3 shows the results of 140 hr of micro-pilot plant operation. The initial feed to the column was 1.9 ppm $Ca^{++}$, and the average feed concentration was 1.6 ppm. The dashed line represents a quadratic curve fit to the feed concentration data, and the dotted line represents a curve fit of the column effluent concentration. The fit to the feed concentration is poor, due to higher error in the reported concentrations. The inductively coupled plasma (ICP) instrument was calibrated to the lower effluent concentrations, so the feed samples were diluted before analysis could be done. This results in higher errors in the feed concentrations.

Two material balances were performed on this system. One balance was around the feed tank, which showed that 4.7 mg $Ca^{++}$/l resin was removed during the operation. The second balance was around the column, where the 5.3 g $Ca^{++}$/l resin was calculated as the resin capacity.

I claim:

1. In a method of producing sodium chlorate crystals wherein sodium chloride in a brine stream containing calcium is electrolyzed in an electrolytic cell to produce sodium chlorate, then passed to a crystallizer where said sodium chlorate crystals are formed, and the mother liquor from said crystallizer is recycled to said electrolytic cell, the improvement which comprises passing at least a portion of said mother liquor through a column containing a cationic chelating ion exchange resin in sodium form before it is recycled to said electrolytic cell, and operating said column so that, on the average, it removes only an amount of calcium equal to the amount of calcium in said brine stream, thereby preventing the concentration of calcium in said mother liquor from becoming greater than the concentration of calcium in said brine stream.

2. An improvement according to claim 1 wherein the concentration of calcium in said brine stream is about ½ to about 5 ppm.

3. An improvement according to claim 1 wherein the temperature of said mother liquor in said ion exchange column is less than 45° C.

4. An improvement according to claim 3 wherein said temperature is less than 35° C.

5. An improvement according to claim 1 wherein the pH of said mother liquor is about 8 to about 9.

6. An improvement according to claim 1 wherein the concentration of calcium in said brine stream as it enters said electrolytic cell is about ½ to about 2 ppm.

7. An improvement according to claim 1 wherein the flow rate of said mother liquor into said column is high enough to result in a significant breakthrough of calcium from said ion exchange column during its operation.

8. An improvement according to claim 1 wherein said column is operated at less than 90% of capacity.

9. An improvement according to claim 7 wherein said column is operated at about 60 to about 80% of capacity.

10. An improvement according to claim 1 wherein said resin is regenerated when it is less than 90% loaded with calcium.

11. An improvement according to claim 10 wherein said resin is regenerated when it is about 60 to about 80% loaded with calcium.

12. In a method of producing sodium chlorate crystals wherein sodium chloride in a brine stream containing calcium is electrolyzed in an electrolytic cell to produce sodium chlorate, then passed to a crystallizer where said sodium chlorate crystals are formed, and the mother liquor from said crystallizer is recycled to said electrolytic cell, the improvement which comprises passing at least a portion of said mother liquor through a column containing a cationic chelating ion exchange resin in sodium form before it is recycled to said electrolytic cell, and operating said column at less than 90% of capacity, said column removing only enough calcium from said mother liquor to prevent the buildup of calcium therein.

13. An improvement according to claim 12 wherein said column is operated at about 60 to about 80% of capacity.

14. An improvement according to claim 13 wherein the concentration of calcium in said brine stream as it enters said electrolytic cell is about ½ to about 2 ppm.

15. An improvement according to claim 13 wherein the flow rate of said mother liquor into said column is high enough to result in a significant breakthrough of calcium from said ion exchange column during its operation.

16. In a method of producing sodium chlorate crystals wherein sodium chloride in a brine stream containing calcium is electrolyzed in an electrolytic cell to produce sodium chlorate, then passed to a crystallizer where said sodium chlorate crystals are formed, and the mother liquor from said crystallizer is recycled to said electrolytic cell, the improvement which comprises passing at least a portion of said mother liquor through a column containing a cationic chelating ion exchange resin in sodium form before it is recycled to said electrolytic cell, and operating said column so that, on the average, it removes only an amount of calcium equal to the amount of calcium in said brine stream, thereby preventing the concentration of calcium in said mother liquor from becoming greater than the concentration of calcium in said brine stream and operating said column so that the flow rate of said mother liquor into said column is high enough to result in a significant breakthrough of calcium from said column during its operation, said column removing enough calcium from said mother liquor to prevent the buildup of calcium therein.

17. An improvement according to claim 16 wherein the concentration of calcium in said brine stream as it enters said electrolytic cell is about ½ to about 2 ppm.

18. An improvement according to claim 16 wherein said column is operated at less than 90% of capacity.

19. An improvement according to claim 16 wherein said column is operated at about 60 to about 80% of capacity.

* * * * *

UNITED STATES PATENT AND TRADEMARK OFFICE
CERTIFICATE OF CORRECTION

PATENT NO. : 5,104,500
DATED : April 14, 1992
INVENTOR(S) : Walter W. Ruthel It is certified that error appears in the above-identified patent and that said Letters Patent is hereby corrected as shown below:

On the title page:
Item [75], change the inventorship to:
   Walter W. Ruthel, Sharon D. Fritts, and Tilak V. Bommaraju Column 5, line 29, delete "$\log(\text{mphd Ca})\log(m^2_{Na})$" and substitute -- $\log(m_{Ca})/\log(m^2_{Na})$ --.

Signed and Sealed this

Eighth Day of June, 1993

Attest:

MICHAEL K. KIRK

*Attesting Officer*   *Acting Commissioner of Patents and Trademarks*